United States Patent

Hill

[15] 3,679,001

[45] July 25, 1972

[54] WELL DRILLING METHOD

[72] Inventor: Gilman A. Hill, 6200 Plateau Drive, Littleton, Colo. 80120

[22] Filed: March 2, 1970

[21] Appl. No.: 15,850

[52] U.S. Cl. ..................................166/292, 175/46, 175/66, 175/71, 252/8.5 B
[51] Int. Cl. ..................................E21b 21/04, E21b 33/138
[58] Field of Search ..........................252/8.5 A, 8.5 B, 8.5 P; 166/292, 293; 175/46, 65, 66, 72

[56] References Cited

UNITED STATES PATENTS

| | | | |
|---|---|---|---|
| 2,146,693 | 2/1939 | Vietti et al. | 252/8.5 B |
| 2,165,824 | 7/1939 | Vietti et al. | 252/8.5 B |
| 2,353,230 | 7/1944 | Garrison et al. | 252/8.5 B |
| 3,244,230 | 4/1966 | Sharp | 166/292 |
| 2,402,588 | 6/1946 | Andresen | 166/270 |
| 2,452,021 | 10/1948 | Wayne | 252/8.5 A |
| 2,165,823 | 7/1939 | Vietti et al. | 252/8.5 B |
| 2,205,609 | 6/1940 | Vail et al. | 252/8.5 B |
| 3,318,396 | 5/1967 | Tailleur | 252/8.5 B |

OTHER PUBLICATIONS

Rogers, " Composition and Properties of Oil Well Drilling Fluids", 1st Edition, Gulf Pub. Co., Houston, Tex. 1948, pp. 417 to 427.

*Primary Examiner*—Stephen J. Novosad
*Attorney*—McGrew and Edwards

[57] ABSTRACT

A well drilling fluid comprises a solution having dissolved therein a relatively small quantity of potassium silicate or, for some applications, sodium silicate or a mixture of sodium silicate and potassium chloride. The body of the fluid may be water or a presently available mud or other drilling fluid with which the silicate is compatible. The fluid on reaching shale sections along the well bore acts to stabilize the shale and prevent its swelling, dispersing or sloughing.

3 Claims, No Drawings

WELL DRILLING METHOD

My invention relates to fluids employed in the drilling of oil and gas wells and the like and particularly to an improved well drilling fluid for decreasing or preventing problems arising from the swelling, dispersing or sloughing of shale sections in the well bore.

During the drilling of oil and gas wells severe problems have been encountered due to the swelling, dispersing and caving or sloughing of shale sections at the wall of the well bore. It is desirable to avoid or eliminate such problems and, accordingly, it is an object of this invention to provide an improved method for drilling well bores and minimizing the swelling, dispersing, sloughing or caving of shale sections at the wall of the well bore.

It is another object of this invention to provide an improved well drilling fluid for well bores which pass through shale sections.

Briefly, in carrying out the objects of my invention in one embodiment thereof, I prepare a drilling fluid which includes a relatively small quantity of potassium silicate dissolved therein. When drill a well employing the method of this invention there is added to the well fluid and dissolved therein a quantity of potassium silicate. Another embodiment of my invention, for some applications, employs sodium silicate instead of potassium silicate. In still another embodiment of my invention, for some applications, I use a mixture of sodium silicate and potassium chloride.

The features of novelty which characterize this invention are pointed out with particularity in the claims annexed to and forming a part of this specification. The invention itself, however, both as to its method of drilling and the composition of the fluid, together with further objects and advantages thereof, will best be understood upon reference to the following description.

Well drilling fluids vary widely in composition and density depending upon the nature of the geologic formations through which the wells are to be drilled. The drilling fluid may be either water based or oil based containing water and may contain various materials and additives which provide a so-called "drilling mud". When these fluids encounter certain shales in the walls of the bore, the reaction of the drilling mud on the shale frequently results in the swelling, dispersing and sloughing of portions of the shale section which may result in substantial caving or collapse of the hole. I have discovered that by providing a small quantity of potassium silicate or of sodium silicate in the drilling fluid that the sloughing and caving of a shale wall section may be minimized or prevented. The quantity of the silicate may vary over a wide range. In many cases, the concentration of the silicate by weight percent may range from 1 to 2 percent of the drilling mud solution. In some cases, concentration as dilute as one-fourth to one-half percent may be adequate, and in other cases concentrations of 3 to 4 percent or more may be necessary to control the reaction of the shales. While drilling, samples of the drill cuttings brought to the surface with the drilling mud can be tested in varying concentrations of potassium silicate, sodium silicate or mixtures of sodium silicate with potassium chloride. From the results of such testing of the drill cuttings, the optimum composition and concentration of the solution may be determined. Also, it is necessary to restrict from use in the drilling mud any constituents which may be incompatible with the silicate solutions.

From the standpoint of economy, I have found that commercially available potassium silicates are well suited to my process and for my drilling fluid and are available in bulk quantities at prices making their use in the practice of this invention entirely feasible. Sodium silicate may be obtained at a lower price and may be preferable for some applications for this reason. In some applications it may be economically preferable to use a combination of sodium silicate with potassium chloride salt to achieve the combined favorable effects of both the potassium ions and the ionized silicate chain complexes.

In practicing the invention, the well drilling fluid may be made up initially with the desired percentage solution of silicate or for some applications it may be desirable to add the silicate only when shale sections are encountered. During the drilling of a well bore the drilling fluid is circulated and returned to a tank, pit, sump or supply reservoir. This supply fluid may be checked periodically to maintain the desired percentage of silicate in solution and additional quantities of the silicate may be introduced if strengthening of the solution is desirable.

The temperatures in well bores increase with depth and at depths below about four thousand feet are generally in excess of 100° F. In this temperature range, the reaction of the salts and the shale is effectively rapid. For shallower wells where the temperatures are lower it may be desirable to heat the drilling fluid to bring it up to a temperature in the more effective range in order to accelerate the shale stabilizing action.

In some drilling operations, it may be desirable to operate the drill for a selected period of time using a fluid with none of the silicate added or with a low concentration and then after stopping the operation circulating to the bottom of the hole drilling fluid with a normal or high concentration of the silicate and allowing this to remain in contact with the bore wall for a substantial time. By operating in this manner, it will be understood that the shale cuttings present in the fluid during drilling will use up little or none of the silicate solution and that the silicate treatment at full strength will be applied to the bore wall after the drilling has stopped and the majority of the drill cuttings have been removed from the bore. By way of example, drilling may be continued over a predetermined period, say twelve hours, using no silicate or a low concentration and then the drilling operation temporarily suspended and the full strength silicate solution may be circulated to the bottom of the hole for treatment of the zone just drilled. In particular, it may be advantageous to circulate to the bottom of the hole the concentrated solution before withdrawing the drill string so the full strength treatment may be effected throughout a selected length of the bore while the string is withdrawn for replacement of the drill bit. This periodic treatment procedure results in substantial saving of the silicate solution.

I claim:

1. The method of drilling a well bore through a geologic formation including a shale section and preventing significant swelling, dispersing and sloughing of the shale which comprises providing a water containing drilling fluid and dissolving therein a quantity of soluble salt from the group consisting of potassium silicate and sodium silicate and a mixture of sodium silicate and potassium chloride, the fluid employed during active drilling being maintained with a low concentration of the soluble salt and wherein upon cessation of drilling the concentration is increased in the fluid in the drilled portion of the bore for treatment of that portion before resuming drilling.

2. The method of drilling a well bore through a geologic formation including a shale section and preventing significant swelling, dispersing and sloughing of the shale which comprises providing a water containing drilling fluid and dissolving therein a quantity of soluble salt from the group consisting of potassium silicate and sodium silicate and a mixture of sodium silicate and potassium chloride, the concentration of soluble salt in the drilling fluid being maintained low during drilling and increased in the fluid circulated to the bottom of the bore upon cessation of drilling for treatment of the freshly drilled portion of the bore.

3. The method of drilling a well bore through a geologic formation including a shale section and preventing significant swelling, dispersing and sloughing of the shale which comprises providing a water containing drilling fluid and dissolving therein a quantity of soluble salt from the group consisting of potassium silicate and sodium silicate and a mixture of sodium silicate and potassium chloride, including the step of drilling the shale section, testing the cuttings with a range of the salt solution and determining the optimum concentration of salt to be added to the fluid.

* * * * *